United States Patent [19]
Wallace et al.

[11] Patent Number: 6,094,304
[45] Date of Patent: *Jul. 25, 2000

[54] MULTI-FUNCTION DAY/NIGHT OBSERVATION, RANGING, AND SIGHTING DEVICE AND METHOD OF ITS OPERATION

[75] Inventors: Robert E. Wallace, Rowlett; Wayne Isbell, Dallas, both of Tex.

[73] Assignee: Litton Systems, Inc., Woodland Hills, Calif.

[*] Notice: This patent is subject to a terminal disclaimer.

[21] Appl. No.: 08/901,421

[22] Filed: Jul. 28, 1997

[51] Int. Cl.[7] .............................. G02B 23/00; G02B 13/16
[52] U.S. Cl. .......................... 359/425; 359/399; 359/400; 359/429
[58] Field of Search ..................... 359/353, 399, 359/400–409, 424–429, 629–632

[56] References Cited

U.S. PATENT DOCUMENTS

| | | | |
|---|---|---|---|
| 2,784,641 | 3/1957 | Keuffel et al. | 359/426 |
| 5,035,472 | 7/1991 | Hansen | 359/353 |
| 5,084,780 | 1/1992 | Phillips | 359/353 |
| 5,329,347 | 7/1994 | Wallace et al. | 359/426 |
| 5,745,287 | 4/1998 | Sauter | 359/428 |
| 5,892,617 | 4/1999 | Wallace | 359/400 |

Primary Examiner—Thong Nguyen
Attorney, Agent, or Firm—Marsteller & Associates, P.C.

[57] ABSTRACT

A multi-function day/night observation, ranging, and sighting device includes a single objective lens group and a single eyepiece lens and provides an image of a scene. The single objective lens group leads to a visible-light first optical path and to an invisible-light second optical path. It will be understood that the terms visible-light and invisible-light are used merely to distinguish the two optical paths, and not as a limitation. In other words, some visible light will pass to the image intensifier tube, and this tube is capable of providing an image in response to light in the visible portion of the spectrum. On the other hand, some light in the infrared portion of the spectrum may pass along the visible-light optical path. As mentioned, the invisible-light second optical path includes an image intensifier tube providing a visible image. The first and second optical paths converge with visible images provided by each pathway being overlaid at a reticle plane. A single light path leads from the reticle plane to the eyepiece lens. A laser provides a pulse of laser light projected into the scene via the single objective lens, and the image intensifier tube is used as a detector for a portion of the laser light pulse reflected from an object in the scene in order to provide a laser range finding function. The device includes a light-emitting display visible through the eyepiece lens and providing ranging information superimposed over the image of the scene as seen by a user of the device. Methods of the device's operation are also disclosed.

36 Claims, 8 Drawing Sheets

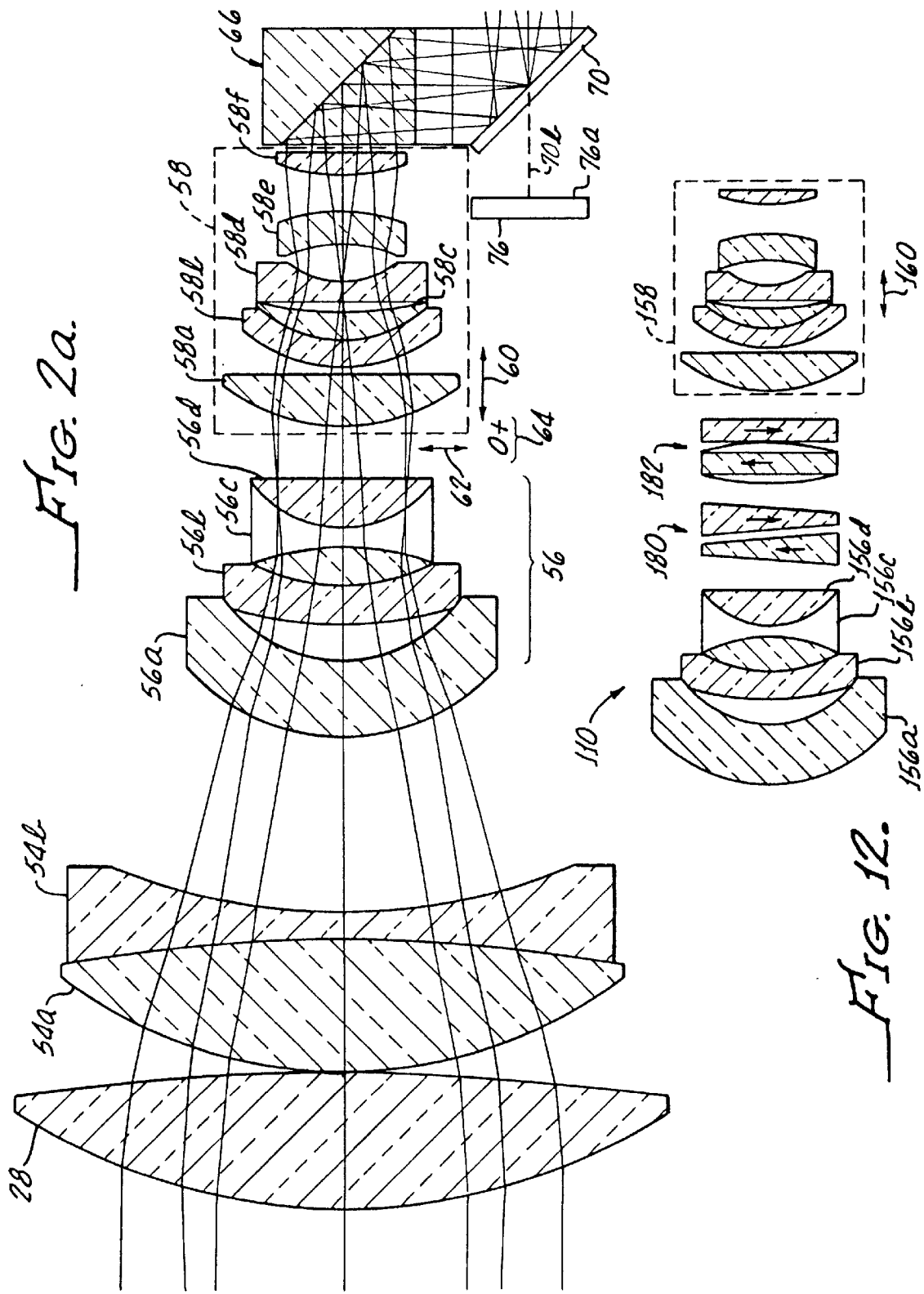

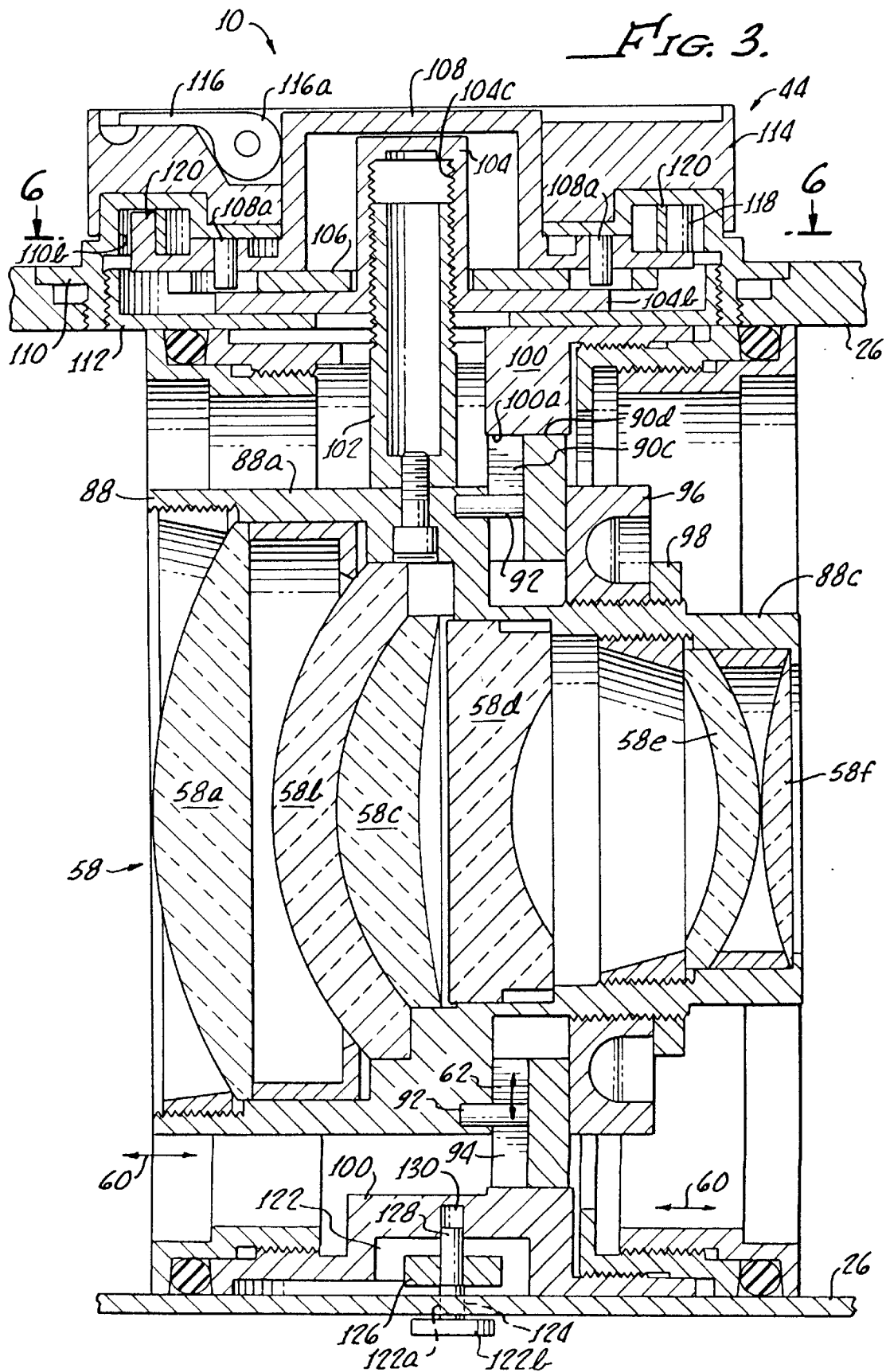

MULTI-FUNCTION DAY/NIGHT OBSERVATION, RANGING, AND SIGHTING DEVICE AND METHOD OF ITS OPERATION

BACKGROUND OF THE INVENTION

1. Field of the Invention

The present invention is in the field of image-magnifying viewing devices (i.e., telescopes) which can be used both in the day time to obtain a magnified view of a distant scene, and which can also be used at night or under other conditions of low ambient lighting in order to view such a distant scene. The view of the distant scene is magnified, and at night is also intensified or amplified by use of an image intensifier tube to provide a visible image when the scene is too dark to be viewed with unaided natural vision. Accordingly, this invention relates to telescopes and other such viewing devices which may be used both in day and at night for observation and surveillance.

The present invention also relates to laser range finding apparatus and method. Such laser range finding apparatus and methods ordinarily project a pulse of laser light into a scene. The laser light pulse illuminates objects in the field of view and is partially reflected from at least one object in the scene whose distance from the observer is to be determined. In order to select this one object, the device may include a reticule and the laser light pulse may be of "pencil beam" configuration. The reflected portion of the laser light pulse is detected at the device, and the transit time for the laser light pulse to travel to and from the object is used to calculate a range to the object using the speed of light as a measuring standard.

This invention is also in the field of telescopic weapon aiming sights which provide a user with an aiming reticule, and which include provisions for bore-sighting the relative position of the reticule on a scene to the trajectory of a projectile. In other words, the telescopic device allows adjustments to place the reticule image on the viewed scene at the location where a bullet or other projectile will strike at a particular range.

2. Related Technology

A conventional day/night telescopic sight is known in accord with U.S. Pat. No. 5,084,780, issued Jan. 28, 1992 to E. A. Phillips. The Phillips patent appears to teach a telescopic day/night sight which has several alternative embodiments. According to one embodiment set out in the Phillips patent, such a telescopic sight includes a single objective lens behind which is disposed an angulated dichroic mirror. This mirror divides light coming into the sight via the objective lens into two frequency bands. Light of longer wavelengths (lower frequencies) is allowed to pass through the dichroic mirror to an image intensifier tube. This image intensifier tube operates in the conventional way familiar to those ordinarily knowledgeable about night vision devices. That is, the image intensifier tube provides a visible image which replicates a dim image or an image formed by invisible infrared light within the so-called near infrared. Thus, the longer wavelength band which passed through the dichroic mirror includes the infrared portion of the spectrum, and provides to the image intensifier tube the frequencies of light to which the tube is most responsive.

The visible portion of the light entering the Phillips sight via the objective lens is reflected by the dichroic mirror into an optical system leading to a combiner and to an eyepiece. At the combiner, the image provided by the image intensifier tube is superimposed on the image from the visible-light channel of the sight, and the resulting combined image is presented to a user of the sight via the eyepiece.

A possible disadvantage of the Phillips sight as described above is that the angulated dichroic mirror can introduce all of coma, astigmatism, and color aberrations into the image provided to the user.

Other versions of the Phillips sight use a separate objective lens for both the day channel and the night channel of the sight. However, the versions of Phillips sight with two objective lenses suffer from an increased size, weight, and expense because of the additional optics and larger housing required to mount and protect these optics.

In each case with the sight disclosed by Phillips, the optical channels for the night sight and the day sight are laterally offset relative to one another. These two offset optical channels are parallel, and the image from these channels is combined for presentation at the eyepiece. However, in each case, the sight taught by Phillips requires separate laterally offset optical channels, and presents the problem of correctly and precisely superimposing the image from these two channels for the user of the sight.

Another consideration with the Phillips sight is the mechanism and size of housing required for effecting windage and elevation adjustments of the reticule. Some versions of the Phillips sight use a reticule plate, while others use an injected reticule (i.e., provided by a projector for a lighted reticule "dot" which is superimposed on the image of the viewed scene). In each case, the objective lens of the device receives a larger scene image (i.e., field of view) than is provided to the user, and the reticule is moved about within this field of view in order to provide windage and elevation adjustments. However, it is often desirable for the user of such a sight to perceive no apparent change in the centering of the reticule on the field of view. This results in a smaller imaged field of view with a centered reticule pattern moving about in a larger field of view provided by the objective optics.

Yet another disadvantage of sights of this conventional type is that the mechanism for moving the reticule is inherently located near the rear of the sight. This location for the reticule mechanism results in the housing of the sight being undesirably large at a location where clearance must be provided for the action mechanisms of many weapons.

Another conventional day/night weapon sight is known in accord with U.S. Pat. No. 5,035,472, issued Jul. 30, 1991 to Charles L. Hansen. The '472 patent appears to disclose a sighting device including a number of dichroic reflectors, which divide the incoming light into spectral bands. The visible one of the spectral bands passes to an eyepiece for viewing by a user of the device. Another of the spectral bands of light passes to an image intensifier tube. A visible image provided by this image intensifier tube then passes to the eyepiece. Yet another spectral band passes to a focal plane array device, such as to a CCD. The CCD is associated with a display device, such as a CRT. The image from the CRT then passes to the user via the eyepiece.

The device disclosed in the '472 patent appears not to provide laser range finding. No provisions appear to be made for a reticule usable in sighting by use of this device. Focusing and adjustment of a reticule position for windage and elevation also appear not to be addressed by the '472 patent.

Conventional laser range finders have also been known for a considerable time. One exemplary version of such a device is known as the MELIOS. This device uses viewing optics, a laser having a projection optical system, and a detector having a separate receiving optical system, all directed at a scene in which an object is located having a range to be determined. In operation, the laser provides a pulse of laser light, and this is projected into the scene via the projection optics. This laser light illuminates the object, and a portion of the laser light is reflected back toward the device. Part of the reflected laser light returning to the device is captured by the receiving optical system, and is directed to a detector. The device includes a timer starting when the laser light pulse is transmitted and stopping when the returning laser light is detected. A calculator portion of the device uses the elapsed time from transmission of the laser light pulse until detection of the returning reflected laser light to calculate the distance to the object.

Another conventional laser range finder is known as the Commander's Viewer Sight. This device uses a catadioptric optical viewing system, and places separate optics for projecting and detecting the laser light in the central obscuration of the viewing optical system. Thus, the viewing optics and laser range finder optics (i.e., projector and detector optics) are coaxial in this sight, but they are nevertheless separate optical structures.

SUMMARY OF THE INVENTION

In view of the deficiencies of the conventional day/night observation and sighting devices it is an object for this invention to avoid one or more of these deficiencies.

In further view of the deficiencies of the conventional telescopic sighting devices, it is an object for this invention to provide such a device which employs movements of a focal lens group perpendicular to an optical axis of the device in order to effect lateral movements of the apparent position of a scene viewed via the device as perceived at an eyepiece of the device.

In addition, it is an object of this invention to provide such a device which employs axial movements of a focal lens group to effect focusing of incoming light at a focal plane of the device.

Still further, it is an object for this invention to provide such a device in which the same lens group which is moved perpendicularly to an optical axis of the device for windage and elevation adjustments is moved axially for focus adjustments.

Further to the above, it is an object for this invention to provide a day/night telescopic observation and sighting device which includes provision for redirecting angularly relative to a light pathway of the device light rays from a distant scene, thus to move the apparent position of the scene as viewed through the device.

Still further, an objective for this invention is to provide such a day/night observation and sighting device in which a pair of Risley prisms are so disposed as to controllably redirect light passing along an optical pathway toward an image plane such that the image provided at the image plane is controllably moved laterally.

Accordingly, the present invention provides an optical device comprising: an optical device comprising: an afocal lens group receiving light from a distant scene and collimating this light; a focal lens group receiving the collimated light and focusing this light to an image plane in a fixed reference frame; and means for performing a function selected from the group comprising: laterally moving the focal lens group in a direction perpendicular to the optical axis of the device to translate the image of the scene relative to the fixed reference frame; and redirecting the collimated light angularly to translate the image of the scene relative to the fixed reference frame.

According to another aspect, the present invention provides A day/night viewing and sighting device comprising; an objective lens receiving light from a distant scene and providing this light to a bifurcated optical pathway, one branch of the bifurcated optical pathway leading to an eyepiece lens, another branch of the bifurcated optical pathway leading to an image intensifier tube, the image intensifier tube providing a visible image replicating the scene, and the optical pathway including a branch extending from the image intensifier tube to the eyepiece lens; the device comprising: an afocal lens group receiving light from a distant scene and collimating this light; a focal lens group receiving the collimated light and focusing this light to an image plane; and means for moving the focal lens group perpendicularly to an optical axis of the device in order to relatively move an image of the scene at the image plane.

Still additionally, the present invention provides according to another aspect a method of operating an optical device to effect movement of a distant scene relative to an eyepiece of the device; the method comprising steps of: providing an afocal lens group, and using this lens group to receive and collimate light from a distant scene; providing a focal lens group receiving and focusing the collimated light to an image plane; and either moving the focal lens group perpendicularly to an optical axis of the device or redirecting angularly the collimated light to relatively move an image of the scene laterally of the device at the image plane.

An advantage of the present invention resides in its combination in a single focal lens group of functions allowing movement of the apparent position of a viewed scene to effect windage and elevation adjustments, and also allowing axial relative movement of the focal lens group to focus incoming light at an image plane of the device. A particularly effective and compact windage, elevation, and focus mechanism is consequently provided by the present invention. Another advantage resides in the use of Risley prisms to controllably effect angular redirection of light rays passing along an optical pathway toward an image plane to shift the image provided at this plane. Thus, windage and elevation adjustments of the apparent position of the image provided by the device can be made with respect to a fixed and always-centered reticle.

Additional objects and advantages of the present invention will be apparent from a reading of the following detailed description of one or more preferred exemplary embodiments of the invention taken in conjunction with the appended drawing Figures, in which like reference characters denote like features or features which are analogous in structure or function, as will be explained.

BRIEF DESCRIPTION OF THE DRAWING FIGURES

FIG. 1 provides an exterior view of a telescopic day/night observation, sighting, and ranging device embodying the present invention being used to observe a distant scene as well as to obtain a range to an object in this scene;

FIG. 1a provides an exterior perspective view of the device seen in FIG. 1 viewed from the opposite perspective;

FIGS. 2a and 2b together provide a diagrammatic longitudinal representation, partially in cross section, of the internal structures of the device seen in the preceding drawing Figures;

FIGS. 3, 4, 5, and 6 respectively provide an assembly view in longitudinal cross section, an exploded perspective view, an axial cross sectional view from the underside of the device, and a longitudinal cross sectional view, all of associated portions of the device seen in the preceding drawing Figures;

FIG. 7 is a fragmentary diagrammatic perspective view of yet another portion of the device seen in the preceding drawing Figures;

FIG. 8 provides a spectroscopic diagram of the light transmission and light reflection performance of a feature of the device as seen in FIG. 7;

FIG. 9 is a graphical presentation of a voltage-versus-time wave form which may be experienced within the device seen in the preceding drawing Figures;

FIG. 10 provides a schematic representation of a control system architecture for the device;

FIG. 11 provides a depiction of a view (i.e., of a distant scene and superimposed reticule and ranging information) which may be seen by a user of the device; and FIG. 12 is a fragmentary cross sectional view similar to a portion of FIG. 2a, but showing particulars of an alternative embodiment of the invention.

DETAILED DESCRIPTION OF PREFERRED EXEMPLARY EMBODIMENTS OF THE INVENTION

An Overview

Figure 1:
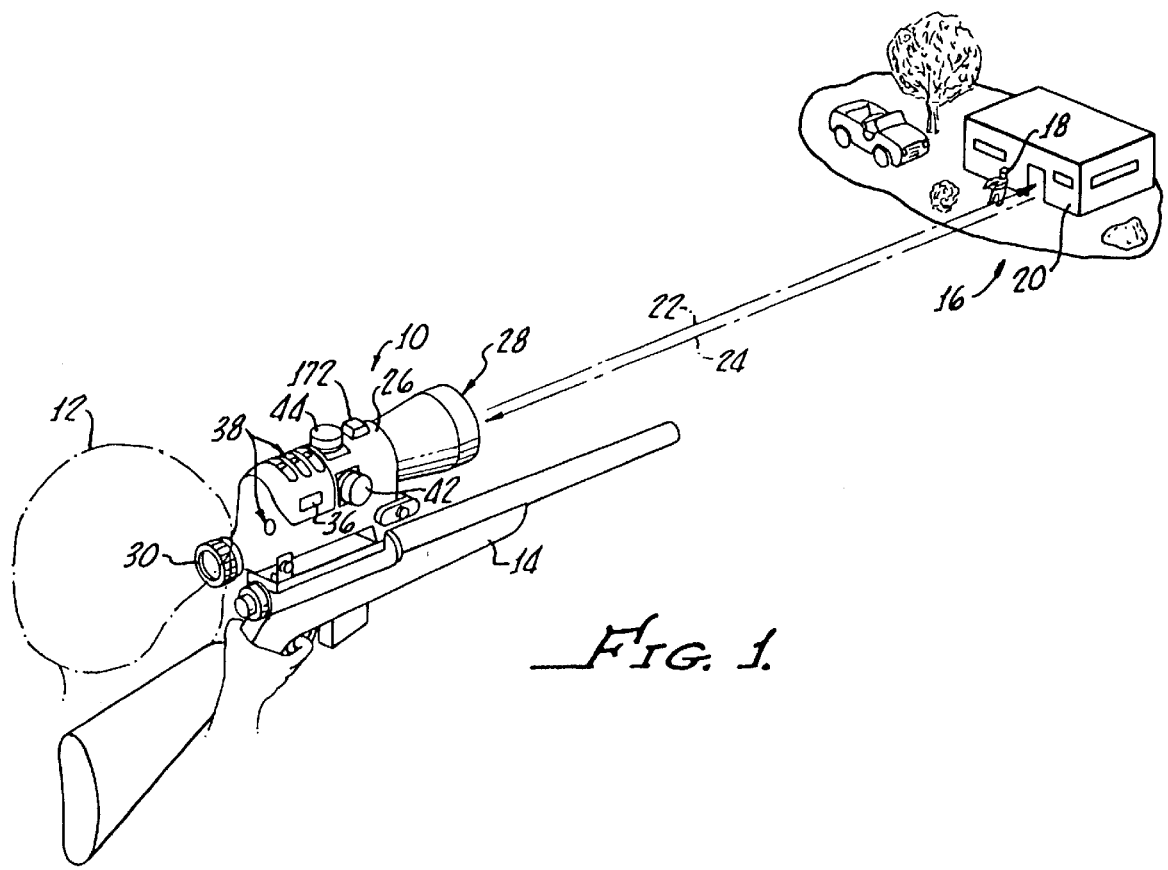
Figure 1A:
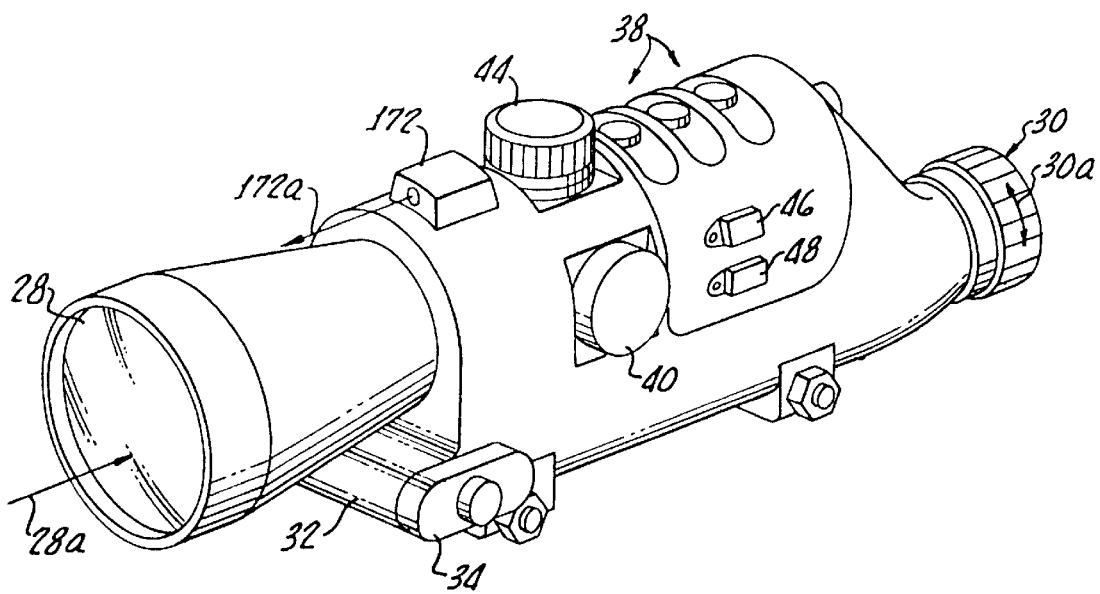

Viewing FIGS. 1 and 1a in conjunction, a telescopic day/night observation, ranging, and sighting device (the "device") is depicted as it may be used by a user 12. In this case, the device 10 is mounted to a rifle 14, and the user 12 is using the device to view a distant scene 16. It will be understood that the device may be used alone without being mounted to a rifle 14, or to any other weapon. On the other hand, the device 10 is not limited to use as a sight for a rifle, and may be used for sighting a variety of weapons. Accordingly, it is seen that the device 10 is not limited to this or any other particular use, and other uses for the invention as embodied in device 10 and in its various other embodiments will be apparent to those ordinarily skilled in the pertinent arts.

In the distant scene 16 are personnel 18, and in the instant case, in addition to being able to observe the scene 16 and personnel 18, the user 12 would like to know the range to these personnel. The personnel 18 may be moving about and are only generally indicated in the scene 16, but in order to obtain a range to this scene 16 the user may select any number of convenient stationary objects in the scene 16 for ranging purposes. By obtaining a range to any one of the stationary objects, an acceptably accurate range to the personnel is also obtained. In the situation depicted, the housing structure 20 would probably be selected by the user 12 for ranging purposes. Alternatively, the user 12 may range to a vehicle, tree, or other natural feature, such as an exposed rock or rock formation, for example, to obtain a range to the scene 16. In the scene 16, a variety of such objects are depicted and are available to the user 12 for ranging purposes.

In order to range to the scene 16, upon a command from the user 12, the device 10 sends out a pulse 22 of laser light. This laser light pulse is of very short duration, and is not visible to the unaided human eye. However, the laser light pulse 22 does illuminate a portion of the scene 16, generally in the center of this scene as viewed by the user 12 via the device 10. Some part of the laser light pulse will be reflected from one or more objects in the scene 16 back toward the device 10, as is indicated by arrow 24. The returning laser light 24 is detected at the device 10, and range information is provided in a selected form to the user. For example, the range information may be presented to the user in numerical form superimposed over the scene 16 as seen through the device 10.

Considering the device 10 now in greater detail, it is seen that device includes a housing 26 which is offset along its length, and which is of stepped outer diameter. These specific features of construction are particular only to the embodiment of the invention depicted in FIGS. 1 and 1a, and the invention is not so limited. The housing 26 at a forward end includes a first lens 28. The first lens 28 is part of an objective lens group, as will be seen. The term "forward" as used here has reference to the direction toward an object or scene to be viewed by use of the device, while the terms "rear" or "rearward" refer to the opposite direction toward a user of the device. In this case, the device 10 has only a single first lens, and this first lens 28 is used to receive light from the scene 16, as is indicated by the arrows 28a. The light 28a will include visible light during day-time use of the device 10. Also, the light 28a may include light both in the visible portion of the spectrum, as well as light in the red end of the visible spectrum and in the near-infrared portion of the spectrum during both day-time and night-time use of the device 10, as will be further appreciated in view of the following.

It will be noted that the objective lens group including first lens 28 is also used as a projection lens group for projecting the pulse of laser light 22 into the scene being viewed by the user 12. The invention is not limited to laser light pulse 22 projecting into the scene 16 via lens 28, and this should be viewed as a convenience and feature of the particularly illustrated and described embodiment of the invention. In addition, the first lens 28 is used to receive the returned portion of the laser light pulse after reflection from one of more of the objects in the scene 16.

At its rear end, the device 10 includes an eyepiece 30 into which the user 12 peers to obtain a magnified (i.e., telescopic) view of the object or scene toward which the device 10 is directed. The eyepiece 30 is rotational, as is indicated by arrow 30a, in order to allow the user 12 to focus this portion of the device. The housing 26 also provides a battery housing portion 32 having a removable cap 34 allowing replacement of a battery (not shown in FIG. 1 or 1a) which is housed in the portion 32. A power switch 36 allows the user 12 to turn on and off a night vision function of the device 10, as will be further described. Also, other operational switches, generally indicated with numeral 38 and to be further described below allow the user to initiate a laser range finding (LRF) operation, and to control other functions of the device 10, as will be more fully explained.

Along the body 26 are located three adjustment knobs generally indicated with the numerals 40, 42, and 44. Knob 40 provides for objective focusing of the device, while knobs 42 and 44 respectively provide for windage and elevation adjustment of a field of view of the scene 16 relative to a fixed aiming reticule of the device 10, all of which will also be explained. A pair of recessed levers 46 and 48 respectively provide for selection of spatial and optical filters to be used in the device 10 during observation and laser range finding operations dependent upon the conditions of use for the device, as will be explained.

Figure 2B:
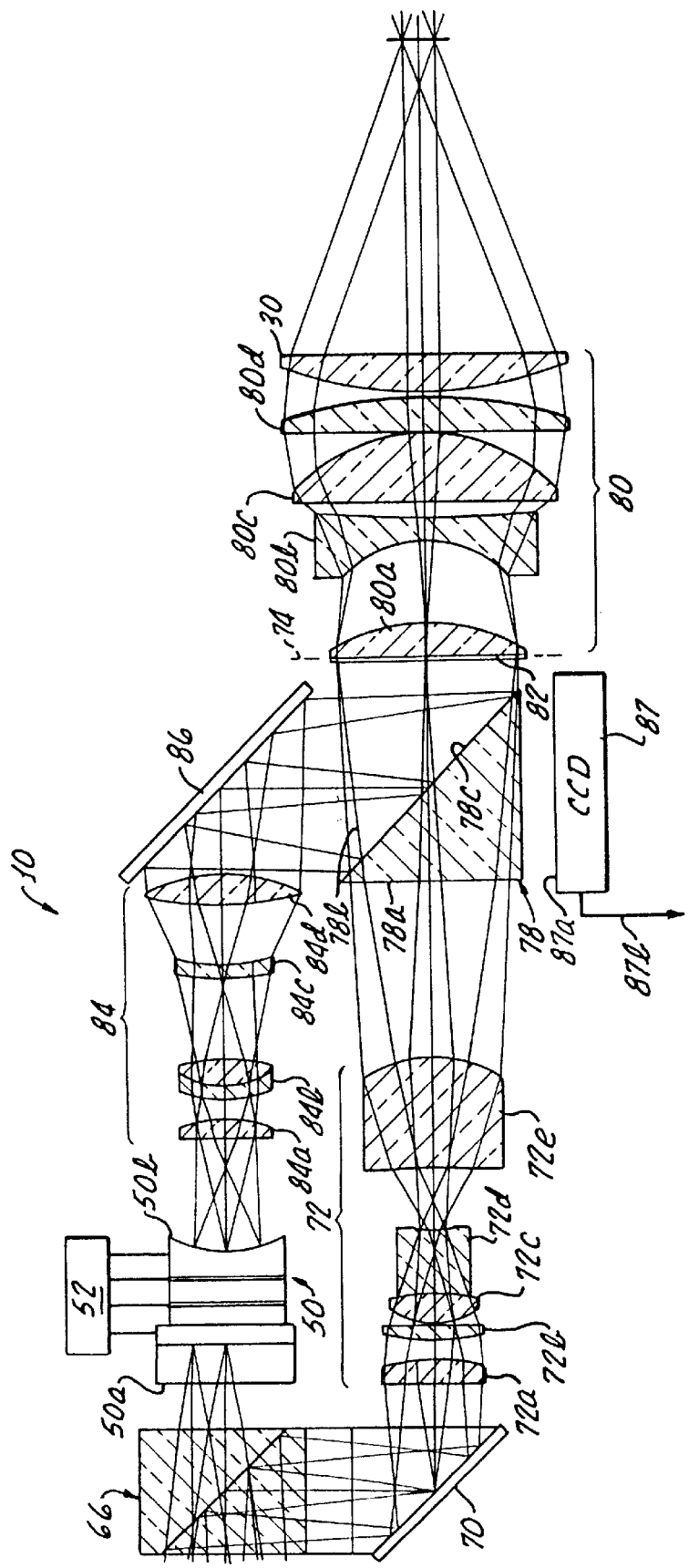

Turning now to FIGS. 2a and 2b and considering this structure in general, it is seen that the device 10 includes a number of lenses in color-corrected groups arranged along a bifurcated and convergent optical pathway leading from the first lens 28 to the eyepiece 30. That is, an image presented at eyepiece 30 may be considered to have traveled along either one or both of the branches of the optical pathway. One branch of this pathway includes an image intensifier tube 50 so that the image presented at eyepiece 30 from this branch of the optical pathway is derived from light admitted to this pathway via first lens 28, but is a replica image.

As those ordinarily skilled in the pertinent arts will know, when such an image intensifier tube is supplied with electrical power of appropriate voltage and current levels by a power supply circuit 52 drawing its electrical power from a battery stowed in the battery housing portion 32 under control of the on/off switch 36. Under night-time or other conditions of low ambient lighting level, the tube 50 will provide a visible image replicating an image in low-level visible light or in invisible near-infrared light. However, the image intensifier tube 50 can also be used in day time to provide an image, and can be used under marginal lighting conditions of dusk or early dawn, for example, to supplement an optical image provided along the other branch of the device 10. The image intensifier tube 50 can also be used in full daylight to provide imaging functions and other functions to be described more fully below.

Generally, those ordinarily skilled in the pertinent arts will know that image intensifier tube 50 includes a transparent window portion 50a behind which is a photocathode responsive to photons of light from a scene to liberate photoelectrons in a pattern replicating the scene, a microchannel plate which receives the photoelectrons and which provides an amplified pattern of secondary emission electrons also replicating this scene, and a display electrode assembly. Generally, this display electrode assembly has an aluminized phosphor coating or phosphor screen. The electron pattern impacting on this screen creates a visible image replicating the scene. A transparent window portion 50b of the tube conveys the image from this output electrode assembly (or "screen") outwardly of the tube so that it can be presented to the user 12.

As will be appreciated by those skilled in the art and also viewing now FIG. 2, the individual components of image intensifier tube 50 are all mounted and supported in a tube or chamber having a forward transparent plate and a rear fiber optic plate (i.e., defining the windows into and out of the tube) cooperating to define a chamber which has been evacuated to a low pressure. This evacuation allows electrons liberated into the free space within the tube to be transferred between the various components without atmospheric interference that could possibly decrease the signal-to-noise ratio. The tube 50 is operated by a power supply 52 drawing electrical power from the batteries in battery housing 32.

Typically, power supply 52 will apply an electrostatic field voltage on the order of 200 to 800 volts to the photocathode in order to allow it to liberate photoelectrons in response to incident photons. Preferably, a constant voltage level of 800 volts is provided by the power supply 52 for connection to the photocathode of the image tube 50. As will be further explained, this constant voltage is controllably, and possibly variably, gated on and off of connection to the photocathode in order to control brightness of the image presented to user 12, both to allow a laser range finding function to be carried out by the device 10, and possibly to allow the user 12 of the device to manually control the brightness level of the image or the gain provided by the image intensifier tube 50 of the device.

After accelerating over a distance between the photocathode and the input surface of a microchannel plate, the photoelectrons enter microchannels of the microchannel plate. The power supply 52 maintains a selected voltage differential across the opposite faces of this microchannel plate (i.e., across conductive electrode coatings carried on these faces) so that the photoelectrons are amplified by emission of secondary electrons to produce a proportionately larger number of electrons upon passage through the microchannel plate. This amplified shower of secondary-emission electrons is also accelerated by a respective electrostatic field generated by power source 52 to further accelerate in an established electrostatic field between the second face of the microchannel plate and the screen. Typically, the power source 52 produces a field on the order of 3,000 to 7,000 volts, and more preferably on the order of 6,000 volts during imaging operations in order to impart the desired energy to the multiplied electrons. This amplified shower of electrons falls on the phosphor This amplified shower of electrons falls on the phosphor of the screen to produce an image in visible light. During laser range finding operations of the image tube 50 this applied differential voltage is preferably increased to a "high gain" level, as will be explained.

Considering now the optical elements of the device 10, it is seen that the first lens 28 admits light from the scene to a lens doublet 54a, 54b. These lenses are part of an afocal lens set also including lenses 56a–56d. Light exiting lens 56d is substantially collimated. The light from lens set 56a–56d is directed to a movable focus cell, generally indicated with the arrowed numeral 58. This focus cell 58 includes lenses 58a–58f, and is effectively a second smaller and relatively movable objective lens set in the device 10. As will be explained further below, the focus cell 58 is movable axially for focusing, as is indicated by arrow 60; is movable vertically for elevation adjustment, as is indicated by arrow 62; and is movable laterally for windage adjustment, as is indicated by arrow 64 (the dot-centered circle and cross respectively indicating the head and tail of a focus cell movement arrow perpendicular to the plane of FIG. 2). The objective lens set 28, 54, 56, and the focus cell lenses 58 cooperatively effect a first inversion of the image of the scene. Light exiting lens 58f is focused to a distant image plane, and as will be further described is to be divided into two spectral bands. Thus, the light exiting lens 58f is focused to two separate image planes dependent upon the wavelength band of the light. Understandably, the longer wavelengths of light will be focused to an image plane at the photocathode of the image intensifier tube 50. The shorter wavelengths of light (i.e., visible light 28a(v)) are focused to an image plane to be identified below.

Figure 7:
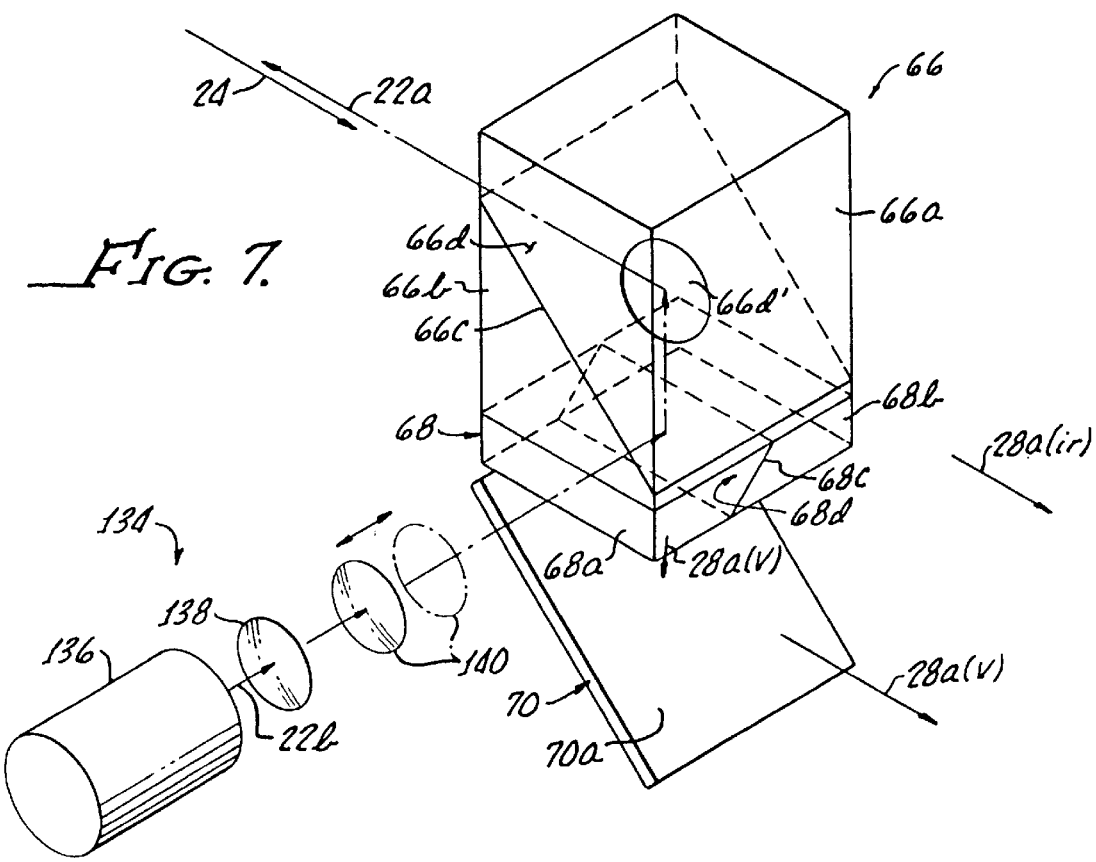

Next, the light which has entered device 10 via first lens 28 encounters a prism assembly 66 which is best seen in FIG. 7. The prism assembly 66 includes a first and a second prism members 66a and 66b, which have an angulated interface 66c. As is seen, the interface 66c is angulated so that incoming light from the first lens 28 will be reflected downwardly. However, interface 66c is provided with a reflective-transmissive dichroic coating, indicated with arrowed numeral 66d. Also, a central oval portion of the dichroic coating 66d is provided with an especially spectrally-selective dichroic coating portion 66d', as is further described below. Importantly, the dichroic coating 66d selectively passes longer wavelengths of light (i.e., from about the orange portion of the visible spectrum through the red portion and on into the near-infrared portion of the spectrum). As will be further explained, the spectrally-selective coating portion 66d' has a weighted average transmissibility of wavelengths to which the image intensifier tube 50 is responsive of about 70%. Thus, the longer wavelengths of light (indicated with arrows 28a(ir) pass through the prism assembly 66, and are focused through the front transparent window of the image intensifier tube 50 onto the photocathode of this tube, viewing FIG. 2 once again and recalling the description above of the operation of the image intensifier tube. In other words, the lens group from and including first lens 28 through the lens 58f have an image plane at the photocathode of the image intensifier tube 50. In response to this light 28a(ir), the image intensifier tube 50 can provide a visible image.

However, a significant portion of the light in the visible portion of the spectrum [indicated by arrows 28a(v)] is reflected from the dichroic coating 66d at interface 66c, and passes downwardly through another plate-like prism assembly 68, which is a portion of the prism assembly 66. Prism assembly portion 68 includes two plate-like members 68a and 68b, which cooperatively define an interface 68c angulated at 45 degrees with respect to the vertical and directed laterally of the device 10. On this interface 68c is located another coating 68d of the spectrally-selective coating material used for area 66d'. The visible light wavelengths (28a (v)) substantially pass through this interface and through the coating 68d. The light passing downwardly through portion 68 reflects from a beam splitter mirror 70 having a first-surface reflective-transmissive surface 70a. Thus, the light 28a(v) is reflected from surface 70a rearwardly of the device 10 toward eyepiece 30.

Behind the beam splitter mirror 70 (i.e., toward the eyepiece 30, and viewing FIGS. 2a and 2b once again) is it seen that device 10 includes a lens group 72 including lenses 72a–72e, and having two image planes. In the direction toward the eyepiece :30, the lens group 72 has an image plane at the location indicated by dashed line 74 and effects a second inversion of the image of the scene, so that an erect image is presented at plane 74. On the other hand, in the direction away from eyepiece 30, the lens group 72 has an image plane located at the plane of a face 76a of a light emitting diode (LED) display 76. The function of this display will be further described below.

Next, light passing toward the eyepiece 30 encounters a combiner prism 78, having a first prism portion 78a and second prism portion 78b, cooperatively defining a reflective-transmissive interface 78c. Light from the prism assembly 70 (and from the display 76 as well, as will be explained) passes through this prism assembly, passing through the image plane 74, and to the eyepiece optics which are generally indicated with numeral 80 and which include eyepiece lens 30. It will be noted that these eyepiece optics 80 are non-inverting.

However, at the plane 74 is disposed a reticule plate 82. This reticule plate includes a selected reticule pattern, such as a cross-hair with minute of angle (MOA) dots (as will be explained with reference to FIG. 11), for purposes of allowing the device 10 to be used in sighting a weapon. The image of the reticule pattern is seen by user 12 superimposed on the image of the scene 16. Further considering the eyepiece optics 80, it is seen that these optics include lenses 80a–80d, and eyepiece lens 30. As noted above, relative rotation of the housing portion 30a moves the eyepiece optics group 80 axially of the housing 26 and focuses the eyepiece lens group at plane 74.

Considering now the image presented by image intensifier tube 50 at window 50b, it is seen that this image is inverted because of the first inversion of the image effected by the objective lenses, as explained above. The image intensifier tube 50 is of non-inverting type, and also provides an inverted image at fiber optic window 50b. A relay lens group, indicated with numeral 84 includes lenses 84a–84d, has an image plane at a plane 74, and effects a second inversion of the inverted image presented by tube 50 so that an erect image is presented to the user 12 at plane 74. The image from image intensifier tube 50 is overlaid at the image plane 74 with any visible-light image (i.e., formed by light 28a(v)) so that the user 12 can see these two images superimposed on one another if both are present. At night and under other low-light conditions, the visible-light image will be fully or substantially absent, and the user will see the image from the image tube 50. Light from the relay lens group 84 is directed by a mirror 86 downwardly into combiner prism 78, to be reflected from the interface 78c toward the eyepiece 30.

Stated differently, the visible light image provided by light 28a(v), and the image presented by the image intensifier tube 50 in response to the light 28a(ir) are superimposed on one another at the image plane 74, and are viewable each alone or together at the eyepiece 30 (i.e., the user is looking at image plane 74). Thus, under day-light conditions, the device 10 may be used using only visible-light imaging, or may combine visible light imaging with the image provided by the image intensifier tube 50, if desired (i.e., even in full day-light conditions, as will be explained). At night-time and under other low-light conditions, the device 10 provides night vision using the image from the image intensifier tube 50.

Further to the above, it will be noted that the light focused to the image plane 74 by lens groups 72 and 84 can also pass through the prism 78 in a downward direction, with the light from lens group 72 being reflected partially from interface 78c. Light from lens group 84 partially transmits through the interface 78c. Thus, yet another image plane is present at a front face 87a of a light responsive electronic imaging device 87. The imaging device 87 may include, for example, a charge coupled device. Other types of electronic imaging devices may be employed at this image plane (i.e., at the plane indicated at 87a) in order to capture electronically an image using the device 10. As a result, the device 10 can provide an image via an electrical interface indicated by conductor 87b.

Moving Focus Cell for Windage/Elevation Adjustment

Turning now to FIGS. 3–6 in conjunction with one another, and considering FIG. 3 first, it is seen in this Figure that the focus cell lens group 58 is movable in the vertical direction in order to accomplish a relative movement of the scene 16 as imaged by the device 10 relative to the fixed reticule 82. The displacement of the focus cell 58 is in the vertical direction for elevation adjustment, but it will be understood that the focus cell 58 is movable laterally of the device 10 (recalling arrow 64) for windage adjustment.

Moving the focus cell 58 from its centered position effectively moves the image of the portion of the scene 16 seen through the device 10 relative to the fixed reticule 82. Importantly, because the device 10 effectively moves the imaged portion of a scene relative to a fixed reticule, the reticule always remains centered in the view provided to the user 10. As will be addressed further below, lateral movements of the focus cell lens group 58 simultaneously move or "steer" the projected laser light 22 on scene 16 so that this projected laser light beam corresponds at its center with the point of aim indicated by reticule 82.

Viewing FIGS. 3–6, it is seen that the focus cell lenses 58a–58f are carried in a tubular focus cell body 88. The focus cell body 88 is of stepped tubular configuration, and includes a large diameter portion 88a having an outer surface 88b, and a reduced diameter portion 88c passing through an aperture 90a in a focus cell cross slide member 90. The large diameter portion and smaller diameter portion of the body 88 cooperatively define a radially extending and axially disposed guide surface 88d. Similarly, the cross slide member 90 defines a pair of opposite radially extending and axially disposed guide surfaces 90b and 90c, only one of which is visible in FIG. 5. The focus cell body 88 carries a pair of diametrically opposite axially projecting pins 92 (only one of which is visible in FIG. 4—both being visible in FIG. 3), which are slidably received into vertically extending guide slots 94 (again, both being visible in FIG. 3) formed on the surface 90c of cross slide member 90.

Extending perpendicularly to these guide slots described above, the cross slide member 90 defines a pair of diametrically opposite and parallel guide surfaces, each indicated with the numeral 90d. A portion of the smaller diameter portion 88c of body 88 is externally threaded, and an internally threaded retainer collar 96 is threaded onto the body 88 so that a radially extending and axially disposed surface 96a slidably engages the surface 90b. A locking ring 98 is also threaded onto the portion 88c of the body 88 in order to lock the collar 96 in place. Consequently, the body 88 is guided on cross slide member 90 by sliding engagement of surfaces 88d/90c, and 90b/96a, with the pins 92 in slots 94 constraining the body 88 to relative vertical motion.

In order to provide for relative horizontal motion of the cross slide member 90 (and of body 88), the device 10 includes a cross slide mount 100, best seen in FIG. 3. This cross slide mount 100 defines a pair of diametrically opposite, parallel and laterally extending guide surfaces 100a, slidably engaging and supporting the cross slide member 90 by engagement with surfaces 90d. In order to effect lateral movement of the focus cell group 58 so as to move the image of scene 16 in horizontal and vertical relative directions (i.e., for windage and elevation adjustments), the focus cell body 88 and cross slide member 90 each carry a respective one of a pair of radially outwardly extending, rigidly attached, and orthogonally disposed threaded stems, each indicated with the numeral 102. One of the stems 102 extends parallel to the slots 94 and is attached to body 88, while the other is parallel to guide surfaces 90d and is attached to cross slide member 90. Each of the guide stems 102 will be seen to effect independent windage or elevation adjustment on the one of the members 88 or 90 to which it attaches.

Figure 4:
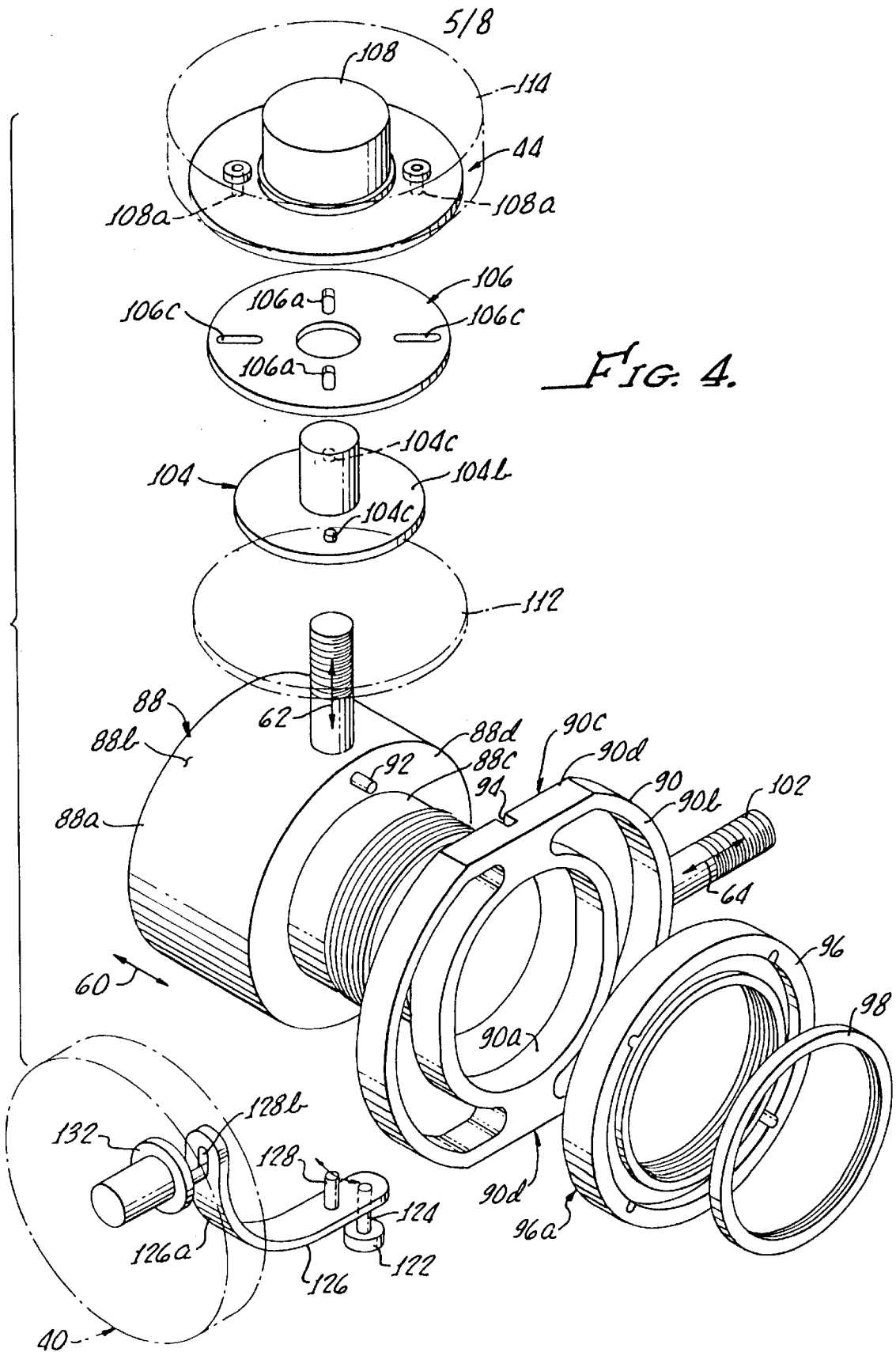

In FIG. 3, only one of the guide stems 102 is visible, the other extends perpendicularly to the plane of this Figure (viewing FIG. 4 for an illustration of the orthogonal relationship of the stems 102). However, the adjustment mechanisms for each stem are essentially the same so that description of one suffices to describe both. FIGS. 3 and 4 show that the stems 102 are each threadably received into an internally threaded bore 104a of a hat-shaped rotatable nut member 104. The nut member 104 includes a radially projecting flange portion 104b, carrying a pair of diametrically opposite pins 104c (only one of which is fully visible in FIG. 4). The pins 104c are each drivingly received slidably into a respective slot 106a of a rotational drive disk member 106 having a central aperture 106b. At aperture 106b, the disk 106 is received over the hat-shaped nut member 104. Further, this drive disk member 106 includes another pair of slots 106c, which are located perpendicularly to the slots 106a. In each of the slots 106c is drivingly received one of a respective diametrically opposed pair of pins 108a carried on a radial flange portion 108b of a knob core member 108.

Viewing FIG. 3, it is seen that this knob core member 108 is rotationally carried by the housing 26 by use of an apertured base member 110, having an aperture 110a into which the knob core 108 rotationally is received. This base member 110 carries an apertured reaction disk 112 (part of which is seen in the exploded perspective view of FIG. 4) by which the nut member 104 is rotationally constrained from axial movement between these two members. Thus, it is seen that the nut member 104 is trapped rotationally between the reaction disk 112 and the base member 110 along with the drive disk 106 and knob core member 108. The disk member 106 effectively provides a Scotch-yoke type of rotational and translational drive mechanism between the knob core 108 and the nut member 104, allowing for relative eccentricity between these two rotational members while providing a rotational driving relationship between them. Because of the driving relationship between the knob core 108 and nut member 104, rotation of the knob core 108 is effective to rotate the nut member and translate stem 102, regardless of the eccentricity which may exist between the members at a particular time.

Captively carried rotationally on the knob core member 108 is a relatively rotational knob member 114, which carries a locking lever 116. When the locking lever 116 is manually pivoted from its illustrated position outwardly about 90°, an eccentric portion 116a of the lever binds with and grips the knob core 108 to allow manual rotation of the knob core. Recalling FIGS. 1 and 1a, it is seen that in each instance the respective knob core 108 and knob member 114 cooperatively make up the knobs 42 and 44 seen on the outside of the device 10 for respective windage and elevation adjustments. In this way, a user of the device 10 can effect manual windage and elevation adjustments of the focus cell 58.

Figure 6:
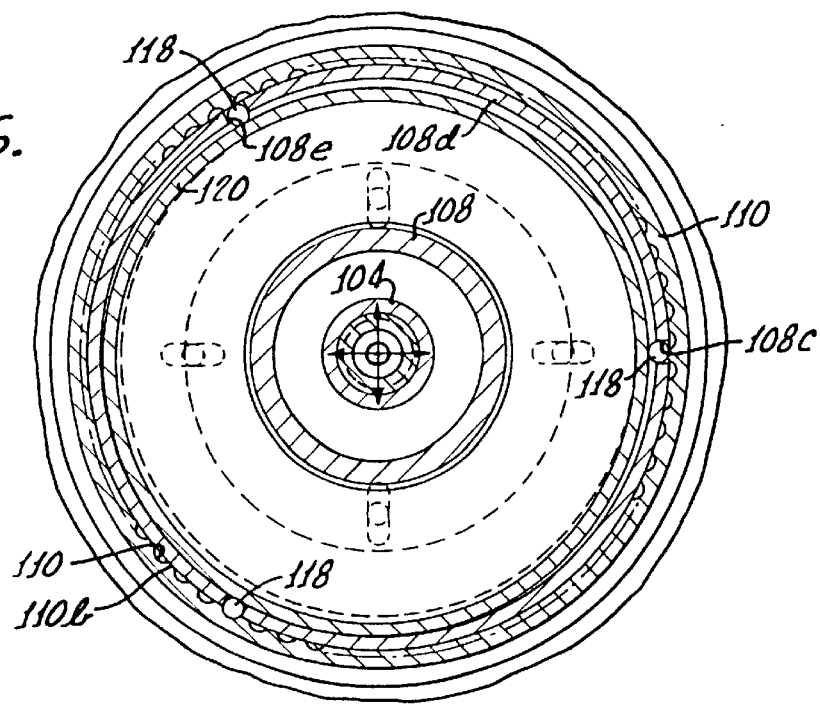

FIG. 6 shows a click-adjustment mechanism of the knob core 108 which is generally indicated with the numeral 108c. This click adjustment mechanism both restrains the knob core 108 against unwanted movements, and also provides both a tactile "feel" and audible "click" indicative of the extent of manual movements effected to the focus cell 58 by the user of the device 10. Viewing FIGS. 3 and 6 in greater detail, it is seen that the base member 110 defines an annular recess 110a, having a multitude of radially inwardly disposed ridges or lands 110b, defining radially inwardly disposed grooves 110c there between. In this case, both the lands 110b and grooves 110c number 62. In order to provide a click-adjustment mechanism 108c of finer resolution than $1/62$ of a rotation of the knob core member 108, a collar portion 108d of the core extends into the recess 110a, and defines three circumferentially regularly spaced apart slot-like apertures 108e. One of three cylindrical detent members 118 is closely movably received into each of the apertures 108d, and each is urged radially outwardly toward a groove 110c by an annular spring member 120.

However, because the number of grooves of the click adjust mechanism 108c (i.e., 62) is not evenly divisible by 3, only one of the detent members 118 can be in a groove 110c at any time. The rotational position error between the other two detent balls and their closest groove will be (62-60)/3, (i.e., $2/3$ of the width of one land 110b) with the positional error being evenly shared by each of the two detent members which are not received in a groove. In other words, one detent ball is received in a groove 110c, and the other two are each $1/3$ of the width of a land 110b away from being received into a groove. Dependent upon the direction of rotation of the knob core 108, one of the detent members 118 will require $1/3$ of a land width to reach its groove in the particular direction, while the other will require $2/3$ of a land width of movement. As a result, the click adjustment mechanism 108c provides a resolution of about $1/180$ rotation per "click" for the knob core 108.

Axial Focusing Movement of Focus Cell 58

Figure 5:
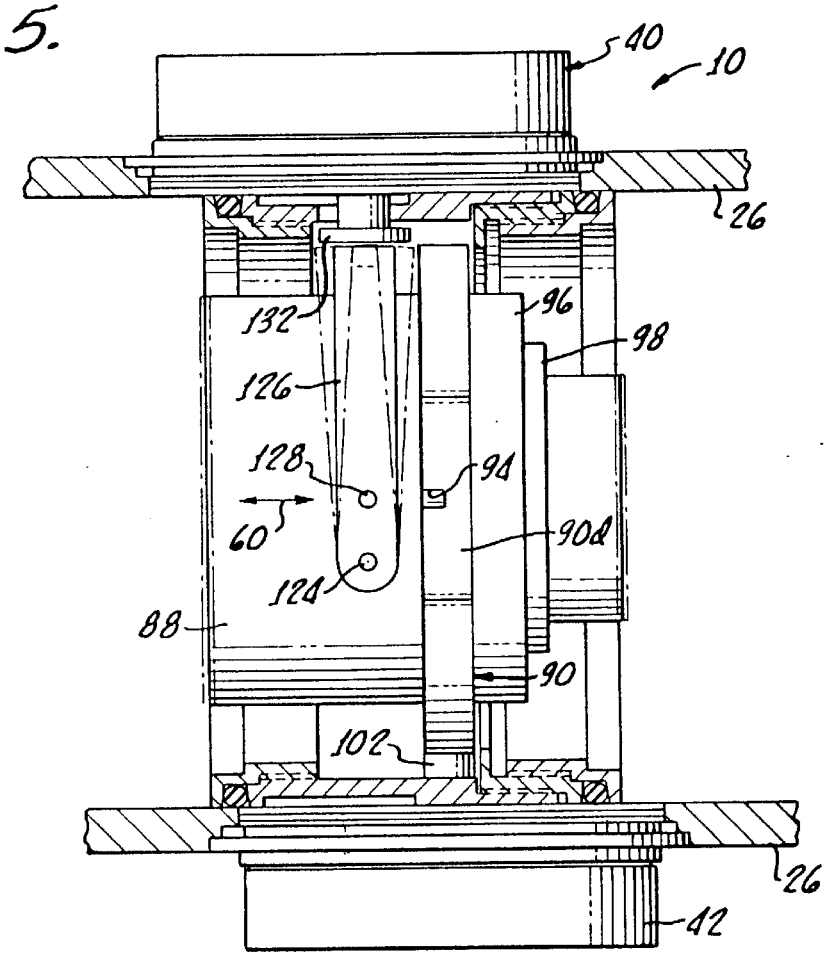

Further, FIGS. 4 and 5 show that the focus cell 58 is also movable axially (recalling arrow 60 of FIG. 2) by axial sliding movement of the cross slide mount 100 along the interior surface 26a of housing 26. This axial movement of the focus cell lens group has the effect of adjusting the focus of light at the image planes (i.e., at the photocathode of the image intensifier tube 50 and at the plane 70b noted above), compensating for the variable distance to the scene 16 being viewed. In other words, the focus cell 58 is moved axially in order to assure that incoming light is focused both on the photocathode of the image intensifier tube 50, and at the image plane 70b. From an infinity-focus position for the focus cell 58, the axial movement of the focus cell 58 required in order to accommodate all other closer distances for focusing of the device 10 need only be about 0.050 inch or less. It will be recognized in this respect that the device 10 is intended to focus from infinity to as close as about 25 yards. Focusing of device 10 at distances closer than about 25 yards is not necessary.

In order to provide such axial movement of the focus cell 58, the housing 26 provides a boss 122 having a bore 122a into which a pin 124 is pivotally received. Outwardly, the housing 26 may have a slight protrusion 122b for boss 122. The pin 124 is secured to and pivotally supports a somewhat curved lever 126. The lever 126 has another pin 128 spaced from pin 124 on the centerline of the body 88 and received pivotally and slidably into a transverse slot 130 defined by cross slide mount 100. The lever 126 curves to wrap partially around the body 88, and at a distal end portion 126a includes a slot 126b extending generally parallel with the pins 124 and 128. Movably received into the slot 126b is a pin 132a carried by the internal rotational portion 132 drivingly connected to the focus knob 40.

In view of the above, it is easily seen that rotation of knob 40 drives the portion 132 in rotation, and that pin 132a gyrates, driving the lever 126 in oscillatory pivotal movement. These pivotal movements of the lever 126 are translated into axial movements of the cross slide mount 100 by pin 128 operating in slot 130. Thus, the user 12 can adjust the focus of the focus cell lens group 58 to account for differing distances to the scenes 16 which the user may want to view.

Laser Injection for Laser Range Finding

Returning to a consideration of FIG. 7, it is seen that the prism assembly 66, including portion 68, is associated with a laser light projection assembly 134. This laser light projector assembly originates a laser light pulse, which when projected outwardly into the scene 16 via the first lens 28, becomes pulse 22. In order to provide a pulse of laser light projected from the prism assembly 66 forwardly through the first lens 28, as is indicated with arrowed numeral 22a, the assembly 134 includes a laser diode 136, which when energized provides a pulse of laser light indicated with numeral 22b. Preferably, this laser light pulse has a wavelength of about 820 nm, which is in the infrared portion of the spectrum and is not visible to humans. The pulse of light 22b is projected through a stationary lens 138 toward a selectively movable lens 140. Lens 140 is illustrated in solid lines in FIG. 7 in its position to provide a "pencil beam" of projected laser light as pulse 22, recalling FIGS. 1 and 1a and the discussion concerning objects in the scene 16 which may be different in reflection of laser light and which may be selected for laser ranging in the scene 16. The lens 140 is selectively moveable under control of the user 12 between the position in solid lines in FIG. 7 and an alternative position shown in dashed lines in this Figure.

In the dashed line position of lens 140 in FIG. 7, the lens 140 causes the pulse of light 22 to have a divergence of about 2 degrees. This causes the laser light pulse 22 to illuminate a portion of the scene 16 which varies in size according to the distance between the device 10 and the scene 16. Understandably, by selection of the area of the scene illuminated by the laser light pulse 22 in view of the magnitude of the reflection from the object to which laser range finding is being performed, the user 12 can choose a combination of object(s), reflection intensity, and giving the best possible laser illumination for viewing.

The light of laser light pulse 22b is projected by lens 140 into the prism member 68a, and reflects from coating 68d upwardly to prism assembly 66. In the prism assembly 66, the laser light pulse 22b is incident upon the coating portion 66d', which for this wavelength of light provides an almost perfect reflection of about 99 percent. Consequently, the laser light pulse 22b is directed forwardly, and exits the prism assembly 66 as laser light pulse 22a, as noted above. Viewing now FIG. 8, it is seen that the coating portion 66d' provides a nearly perfect reflection at the shorter wavelengths of visible light which must be reflected from this coating downwardly to pass to eyepiece 30. At the longer infrared wavelengths, the coating 66d' has a low magnitude of reflection, and has a transmissibility weighted over the wavelengths to which the image intensifier tube 50 is responsive of about 70%.

Further, viewing the ray trace of FIGS. 2a and 2b, it is seen that a significant portion of the light which is focused at the image tube 50 passes around the portion of interface 66c where the area of coating 66d' is located. Accordingly, each area of the photocathode of the image tube 50 will receive sufficient light that a significant shadow is not cast by the coating portion 66d'. Considered from an optical analysis approach, the light received in the center of the image tube will be about 91% of the possible light level were the coating 66d' not present. In other words, the image provided by image tube 50 does not have a shadow or darkened area because of obscuration from coating portion 66d'.

Figure 8:
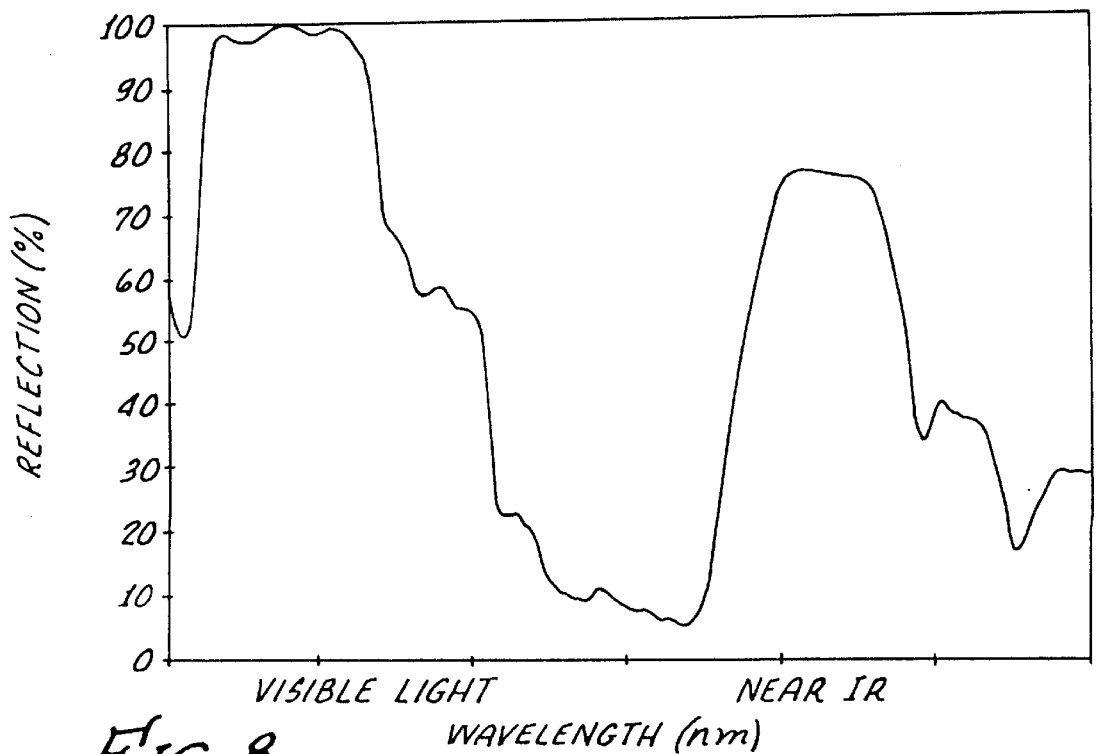

Again, at the longer light wavelengths centered around the 820 nm wavelength for laser light pulse 22, it is seen in FIG. 8 that the coating 68d' has a magnitude of reflection which averages better than 80 percent. Accordingly, the laser light pulse 22b from laser diode 136 is reflected from the coatings 68d at interface 68c, and from coating 66d' at interface 66c, to be projected forwardly as pulse 22a (viewing FIG. 7) and to become pulse 22 when it is projected from the first lens 28 into the scene 16.

Further considering this projection of pulse 22, it is seen that the laser light 22b/22a has a path outwardly of the device 10 through the focus cell group 58 and through the other lenses leading to and through first lens 28 which is opposite to the incoming light from the scene 16. In view of the description above of how movements of the focus cell lens group 58 in the lateral directions (i.e., X-Y movements) are effective to move the viewed scene as perceived through the first lens, it will be understood that these movements of the focus cell lens group simultaneously move the projected laser light 22 in the scene 16. During manufacture of the device 10, the point of projection of laser light 22 is aligned with the center of the scene 16 (i.e., with the center of the reticle pattern seen in FIG. 11). In this way, a user of the device can select an object with which to perform a laser range finding operation by setting the reticle pattern on this object and commanding a LRF operation. Additionally to the above, as the user of the device 10 makes windage and elevation adjustments of the device to account for variations in mounting of the device on the weapon, and for ballistic differences in the ammunitions and projectiles employed, these adjustments simultaneously "steer" the laser range finding light 22 in the scene 16. In other words, the projected laser light 22 always coincides with the scene location marked by the reticule 82.

Imaging using Image Intensifier Tube 50

Further to the above, it will be recalled that although the device 10 may provide to a user an image entirely in visible light received by first lens 28, the alternative mode of operation is imaging by use of image intensifier tube 50, either alone (i.e., as a night vision device), or as an adjunct to the visible-light image. To this end, the power supply circuit 52 is provided in order to operate the image intensifier tube 50. This power supply circuit provides for a constant voltage level (preferably of −800 volts) to be provided to the photocathode of the tube 50, and to be gated on and off in a duty cycle in order to control the brightness of the image provided by the tube 50. This duty cycle may be variable and may be automatically controlled (as will be seen), or may be manually controlled. This aspect of control of the brightness level of the image provided by tube 50 may be controlled by switches 38, one of which may serve as a "brightness increase" slew switch, and another of which may serve as a "brightness decrease" slew switch. Alternatively, an analog type of manual control for brightness may be provided on the outside of housing 26 where it is accessible to the user 12. Such an analog control may take the form of, for example, a rotational knob which by its rotational positions controls the brightness of the image from tube 50.

Under use conditions of comparatively high brightness, but which are still too dim to provide a good image by natural light alone, the user of the device 10 can supplement the natural light image provided by the device 10 by also operating the image intensifier tube 50. Under these use conditions, the image tube 50 may have a lower brightness level. Conversely, on a dark night, the image tube may be operating with a high brightness level. On the other hand, during day-time imaging, the image intensifier tube may have its brightness level turned completely down. In other words, the duty cycle gating of constant −800 volts to the photocathode of the tube 50 may be as low as $1 \times 10^{-4}\%$. This allows the image tube 50 to provide an image in full day light, and to still be used as a sensor for laser range finding operations, as will be further explained.

During day-time uses of the device 10 with image tube 50 turned on, the user will most preferably employ an optical band-pass notch filter (to be further described below). Such a filter has the advantage of significantly decreasing or removing wavelengths of light from that light reaching image tube 50 other than right around the wavelength selected for laser light 22. In this case, that wavelength is preferably 820 nm. Even with such a filter introduced into the optical pathway leading to the tube 50, the brightness level of the tube may be turned down by the user because the day-time scene is so rich in photons. The image tube 50 can still provide a supplemental image from the light which does reach it, but its response during laser range finding operations is considerably improved because of an improved signal to noise ratio.

Accordingly, it is seen that the brightness level setting for the tube 50 is variable, and may be at a low setting at a time when the user 12 wants to perform a laser range finding operation.

Image Intensifier Tube Operation and Laser Range Finding Operation

Recalling the above, it will be seen that the user 12 may want to perform a laser range finding (LRF) operation using the device 10, and further may want to perform this LRF operation at a time when the brightness level of the image intensifier tube 50 has been turned down by the user. In order to allow the brightness level adjustment for the image intensifier tube 50 the power supply 52 provides a constant voltage level, preferably about −800 volts, which can be supplied to the photocathode of the tube 50. Further, this power supply circuit gates this constant voltage level on and off of connection to the photocathode at a constant selected frequency in a duty cycle. This duty cycle may be variable or may be a selected constant value of duty cycle. The duty cycle level at which the constant voltage level is connected to the photocathode of the tube 50 largely controls the brightness level of the image provided by this tube (gain at the microchannel plate also has an effect, as those ordinarily skilled will appreciate).

As pointed out above, the duty cycle for gating of the photocathode of image tube 50 may be varied by use of manual controls available to the user of the device 10. For example, in response to manipulation of the slew switches noted above, the user may control brightness for the tube 50. Preferably, the duty cycle frequency is 50 Hz in order to avoid any visible flicker in the image provided to the user 12 as a result of the brightness control function.

Conversely, it should be kept in mind that when the duty cycle for image tube 50 is 100%, the image intensifier tube 50 provides its maximum gain and maximum brightness for the image provided by this tube. Alternatively, the user 12 may select a lesser brightness depending on the use conditions for the device 10 and the user's preferences by commanding the duty cycle to be a lower value (i.e., less than 100% and as low as $1 \times 10^{-40}\%$) by use of slew switches 38.

Figure 9:
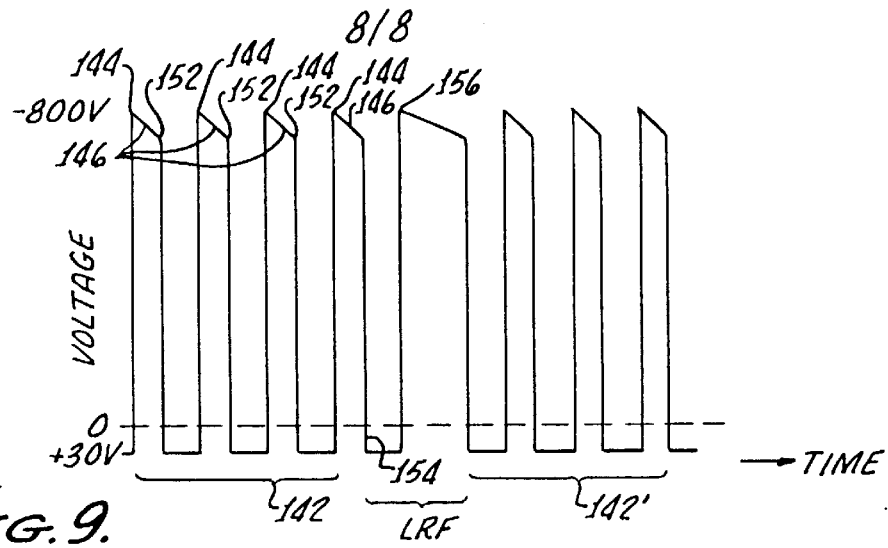

Now, viewing FIG. 9 it is seen that the portion 142 depicts a voltage gating wave form at the photocathode of the image intensifier tube 50 which may apply either when the user 12 has turned down the brightness of the tube 50 to some selected level, or which may represent a fixed duty cycle for the device 10 (for example, under day-time conditions). In the depicted case, the duty cycle is about 20%, which is merely exemplary. The point is that the duty cycle is less than 100% to control the brightness of the image provided by tube 50. As is seen in the portion 142 of this graph, the voltage wave form includes a peak 144 substantially at −800 volts indicating the connection of the photocathode to the constant voltage level provided by power supply 52. Following each peak 144 is an interval 146 of open-circuit voltage decay because the power supply circuit 52 opens connection of the photocathode to the −800 volt supply, and voltage decays at a natural capacitor-discharge open-circuit rate. The magnitude of this open-circuit voltage decay is not great because the time interval is short (i.e., about 1/50th second for a 50 Hz frequency of duty cycle gating).

The power supply 52 in this instance is placing charge on a virtual capacitor existing within the image intensifier tube 50 between the photocathode and a microchannel plate of the tube. Next in each duty cycle as is indicated at 148, the power supply 52 connects the photocathode to a constant relative-positive voltage level of about +30 volts to effect a "hard turn off" of the photocathode. In other words, when connected to the relative positive voltage level, the photocathode of the tube 50 is not responsive to photons of light to release photoelectrons in the tube. Preferably, this constant positive voltage level is about +30 volts relative to the front face of the microchannel plate in the tube 50. Because the tube has a time interval in each duty cycle during which it is not responsive to photons of light, the brightness of the image provided by the tube 50 is decreased.

Figure 10:
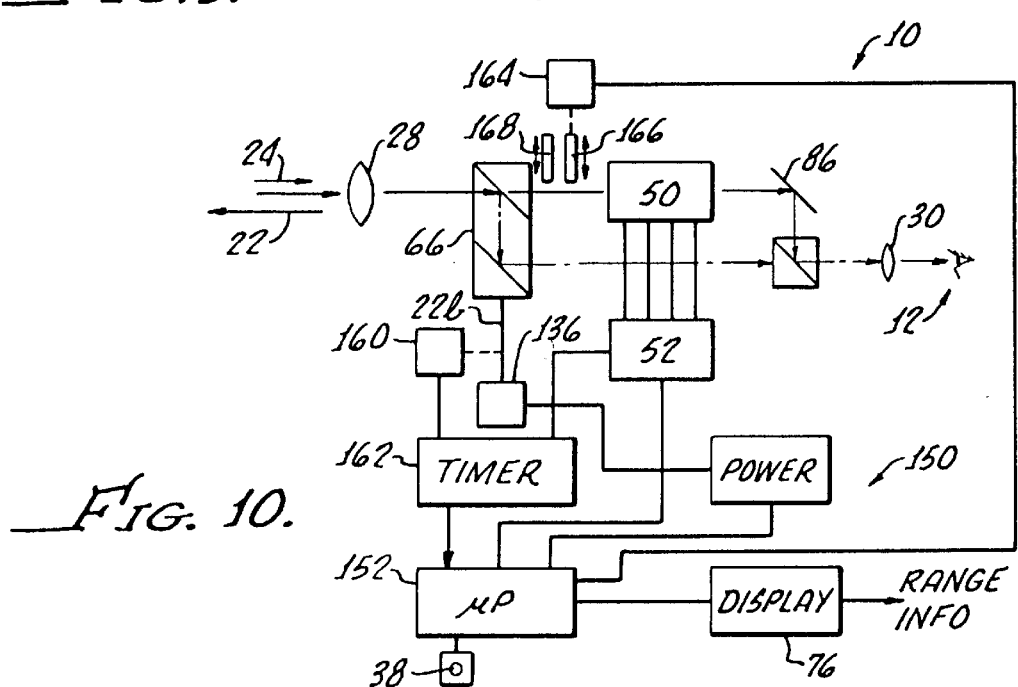

However, it will be noted that when the brightness and gain of the tube 50 are turned down, the tube is also not providing its best amplification in its prospective use as a sensor during laser range finding operations. Considering now FIGS. 9 and 10 together, it is seen that the device 10 includes a laser range finding control circuit 150 which at a microprocessor portion 152 receives a LRF control input from the user 12 via a switch 38 commanding the device 10 to perform a laser range finding operation. In response to this LRF control input, the control circuit 150 commands the power supply 52 to switch the photocathode of the image intensifier tube 50 momentarily to the +30 volts. This connection is indicated on FIG. 9 at 154, and is followed after a selected time interval by connection of the photocathode to the −800 volts constant level provided by the power supply 52 for a subsequent time interval. This connection is indicated at 156 on FIG. 9. In the interval while the photocathode is connected to the +30 volts level, the control circuit 150 provides an input to the laser diode 136 via a laser power supply 158. The laser diode 136 responsively provides the pulse of laser light 22b, which will become the pulse 22 projected via the first lens 28 into the scene 16, as described above. A sensor 160 senses the pulse 22b, and provides a starting command to a timer 162.

The laser light pulse 22 is projected into the scene 16 as described above during the time interval while the photocathode of the image intensifier tube 50 is connected to the +30 volt level from power supply 52 and as a result is unresponsive to photons of the laser light pulse 22 (i.e., pulse 22 originates with pulse 22b and 22a) which may be back-scattered from various lens and prism surfaces within the device 10 to the image tube 50. In this same interval, the control circuit 150 provides an input command to an actuator 164. The actuator 164 moves a spatial filters 166 into the light path (i.e., the path for light 28a(ir)) between prism 66 and image intensifier tube 50. Possibly, two or more alternative spatial filters may be provided (i.e., with differing sized of apertures), the selection of a particular one being dependent upon the position of lever 46. These spatial filters are essentially opaque blocking plates or shutters which define a central aperture allowing reflected laser light to be returned to the image intensifier tube from a selected central portion of the scene 16. The size of the portion of the scene 16 from which reflected laser light is received at tube 50 is dependent upon the size of the aperture in the spatial filter 166. For example, one of two alternative spatial filters 166 may have an aperture of about 2 mm., while the other may have a larger aperture of about 12 mm.

Also, dependent upon the position of lever 48, an optical filter 168 may be manually moved into the light path between prism 66 and image intensifier tube 50. The optical filter 168 is a band-pass type, and transmits light substantially at the 820 nm wavelength of the laser diode 136 (i.e., the wavelength of pulse 22) while partially blocking wavelengths other than this. Again, during day-time laser range finding operations, use of the optical filter 168 assists in filtering out other adjacent wavelengths of infrared light which may be rich in the day-time scene, and thus improves the signal to noise ratio for the image intensifier tube 50 in its mode of operation as a sensor for laser range finder operation.

Further, as is described above the returning laser light 24 reflected from an object in the scene 16 is received by image tube 50 after the photocathode has been connected to the −800 volt level (i.e., after time instant 156 of FIG. 9) and is very responsive to the returning laser light. The connection to the −800 volt level indicated at 156 is maintained for a sufficient time interval to insure that the returning laser light pulse is received by the tube 50 while the photocathode is highly responsive to photons. Further, the microchannel plate of the image tube 50 has a voltage differential applied across it which makes it have a high gain level. As may be appreciated, the microchannel plate for imaging purposes may have a differential voltage applied which is less than the full high-gain differential voltage level. This may be the case, for example, because viewing conditions are bright, or because a bright source of light is present in the viewed scene. Regardless of the reason for the microchannel plate of the image tube having less than the high-gain level of voltage differential applied, when a LRF operation is commanded, this differential voltage across the microchannel plate is changed to a high-gain level substantially simultaneously with the application of the high-response voltage to the photocathode (i.e., at moment 156 in FIG. 9).

Consequently, in response to the reflected portion 24 of the laser light pulse 22, the tube 50 experiences an electron pulse which provides a current flow from the screen and is sensed by a connection through the power supply 52 into timer 162. The timer thus stops, with the interval of its operation measuring the time required for light to travel to and from the scene 16. This measured time interval is read by microprocessor 152 and the distance to the scene is calculated using the speed of light as a measuring standard. The microprocessor 152 then provides a range output via the display 76. As mentioned above, the display provides an image which shines though the reflector 70 and combiner prism 78 and is visible to the user 12 in eyepiece 30.

As FIG. 9 depicts, after the connection of the photocathode of the image tube to the −800 volt level in anticipation of the receipt of the returning laser light pulse 24, and after a sufficient interval to insure reception of the reflected laser light pulse, the power supply 52 then resumes the gating operation indicated at 142', which is a continuation of what ever gating operation had been going on prior to the LRF operation in order to control image brightness and gain of the tube 50 for the user of the device 10. After the LRF operation, the spatial filter is also withdrawn from the light path by actuator 164.

Figure 11:
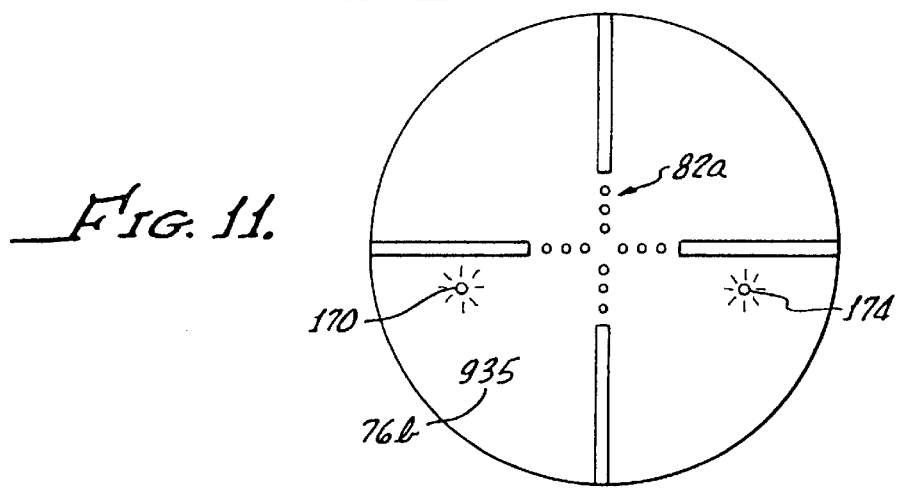

FIG. 11 provides a representative example of the image provided by the device 10, which includes the reticule image 82a provided by reticule plate 82, and range information 76b provided by LED display 76. As is seen on FIG. 11, the LED display 76 also provides (if applicable) an illuminated indicator 170, which will be blinking if the batteries of the device 10 are running low on power. Also, optionally, the device 10 may include an external infrared spot light illuminator 172 (best seen in FIG. 1a) which projects a beam of infrared light 172a into the scene 16 in order to provide illumination under extremely dark conditions. That is, during such extremely dark conditions as may exist within a tunnel or inside of a building basement without windows, not even the image intensifier tube 50 will provide an image without some supplemental infrared light illumination. Under these conditions, the user of the device 10 may turn on the illuminator 172, and the illuminator warning indicator 174 seen in FIG. 11 will remind the user that this illuminator is on. Because the infrared light provided by the illuminator 172 is also visible to others having night vision equipment and may reveal the presence and position of the user 12, such supplemental illumination is generally used only intermittently.

FIG. 12 provides a fragmentary view similar to a portion of FIG. 2a of an alternative embodiment of the device 10. In order to obtain reference numerals for use in describing this alternative embodiment, features which are the same or which are analogous in structure or function to features described or depicted above, are referenced on FIG. 12 using the same numeral used above, and increased by one-hundred (100). Not all features having a reference numeral mentioned below are seen in FIG. 12. In cases where a feature not seen in FIG. 12 is referred to, the feature of FIGS. 1–11 having this numeral (i.e., minus 100) is indicated.

Viewing FIG. 12, it will be understood that a device 110 includes an first lens 128 admitting light to a lens double 154a and 154b (none of these being shown in FIG. 12). The lenses 128 and 154 pass light to the rest of an a-focal lens group including these lenses and lenses 156a–156d. Collimated light provided by the afocal lens group through lens 156 is received by a movable focus cell lens group 158. However, in contrast to the embodiment depicted and described above, the focus cell lens group 158 is movable only axially for focusing, and is not at all movable laterally or vertically of the sight 110 for windage and elevation adjustment. In order to provide for movement of the image received via the first lens 128 relative to the reticule plate of the device 110, the device includes two pairs of relatively rotatable Risley prisms, respectively indicated with numerals 180, and 132. Each prism in each set of prisms is selectively counter rotatable relative to the other prism in the set, and each prism set has a null position in which light enters and leaves the prism set in rays which are parallel from one side of the prism set to the other.

However, as the prisms in each prism set 180 or 182 are counter rotated relative to one another, the light traversing the prism set is angularly redirected relative to its direction before the prism set and relative to the optical axis of the device 110. The prism set 180 has its null position arranged so that relative rotation of the prisms in this set redirects the light traversing this prism set in an horizontal axial plane parallel with the optical axis of the device. This prism set 180 is connected to the windage adjustment knob 142 (not seen in FIG. 12) to relatively rotate the individual prisms of this set in counter rotation with the particular direction of counter rotation dependent upon which way the knob 142 is rotated. Consequently, the image provided via first lens 128 is moved in a direction perpendicular to the optical axis of the device at the fixed reference frame represented by reticule 82.

Similarly, the prism set 182 is connected to the elevation adjustment knob 144 to relatively rotate in opposite directions dependent upon which way the elevation adjustment knob is turned by the user of the device. As a result, when the elevation adjustment knob is rotated the collimated light is angularly redirected in an axial plane which is vertical and the image received via first lens 128 is moved in a vertical (i.e., elevation adjustment) direction relative to the fixed reference frame of reticule 82. Because each set of Risley prisms 180 and 182 is independently adjustable (i.e., counter rotatable) without effect on the other set of prisms, the windage and elevation adjustments effected by a user in the device 110 have no effect on one another. Also, because the Risley prisms 180 and 182 are disposed in collimated light space between the afocal lens set 28 through 156 and the focus cell lens set 158, none of the windage, elevation, or focus 35 adjustments of the device 110 has any affect on the others (the latter adjustment being effected by axial relative movement of the focus lens groups 158—recalling the description above).

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. An optical device comprising:
    an afocal lens group receiving light from a distant scene and collimating this light along an optical axis of the device;
    a focal lens group receiving said collimated light and focusing this light to an image plane in a fixed reference frame to provide an image of the scene; and
    said focal lens group including means for performing a function selected from the group consisting of: laterally moving the focal lens group in a direction perpendicular to the optical axis of the device to translate the image of the scene relative to the fixed reference frame; and redirecting the collimated light angularly to translate the image of the scene relative to the fixed reference frame.

2. The optical device of claim 1 further including means for moving said focal lens group axially to focus said light at said image plane of said device.

3. The optical device of claim 2 in which said means for moving said focal lens group axially includes a focus cell body carrying said focal lens group.

4. The optical device of claim 1 wherein said means for moving said focal lens group laterally of said device includes means for moving said focal lens group laterally of said device along a pair of mutually orthogonal directions mutually exclusive of one another.

5. The optical device of claim 4 in which said pair of mutually orthogonal directions are respectively oriented horizontally and vertically of said device.

6. The optical device of claim 1 wherein said means for moving one of said focal lens group laterally of said device, and for redirecting the collimated light angularly includes means for moving said collimated light laterally of said device along one of a pair of mutually orthogonal directions.

7. The optical device of claim 6 in which said means for moving one of said focal lens group laterally of said device, and for redirecting the collimated light angularly includes a pair of Risley prisms disposed in said collimated light between said afocal lens group and said focal lens group.

8. The optical device of claim 7 further including means for relatively rotating said pair of Risley prisms simultaneously in opposite directions.

9. The optical device of claim 7 further including another pair of Risley prisms disposed in said collimated light between said afocal lens group and said focal lens group.

10. The optical device of claim 9 further including means for relatively rotating said another pair of Risley prisms simultaneously in opposite directions.

11. The optical device of claim 10 in which said pair of Risley prisms and said another pair of Risley prisms are disposed to laterally move said collimated light laterally of said device along lateral directions which are mutually orthogonal to one another.

12. A day/night viewing and sighting device comprising;
    an objective lens receiving light from a distant scene and providing this light to a bifurcated optical pathway, one branch of said bifurcated optical pathway leading to an eyepiece lens, another branch of said bifurcated optical pathway leading to an image intensifier tube, said image intensifier tube providing a visible image replicating said scene, and said optical pathway including a branch extending from said image intensifier tube to said eyepiece lens; said device comprising:
    an afocal lens group receiving light from a distant scene and collimating this light;

a focal lens group receiving said collimated light and focusing this light to an image plane; and means for moving one of said focal lens group and said light collimated by said afocal lens group perpendicularly to an optical axis of the device in order to relatively move an image of said scene at said image plane.

13. The device of claim 12 wherein said image intensifier tube defines a respective image plane at which said light is focused to provide an image, and further including means for moving said focal lens group axially to focus said light at said respective image plane of said image intensifier tube.

14. The device of claim 13 in which said means for moving said focal lens group axially includes a focus cell body carrying said focal lens group.

15. The device of claim 12 wherein said means for moving one of said collimated light and said focal lens group perpendicularly to said optical axis of said device includes means for moving said focal lens group laterally of said device along a pair of mutually orthogonal directions mutually exclusive of one another.

16. The device of claim 15 in which said pair of mutually orthogonal directions are respectively oriented horizontally and vertically of said device, thus to provide respective windage and elevation relative movements of an image of said scene provided at said eyepiece lens.

17. The device of claim 12 wherein said means for moving one of said collimated light and said focal lens group perpendicularly to said optical axis of said device includes means for moving said collimated light laterally of said device along one of a pair of mutually orthogonal directions.

18. The device of claim 17 in which said means for moving said collimated light includes a pair of Risley prisms disposed in said collimated light between said afocal lens group and said focal lens group.

19. The device of claim 18 further including means for relatively rotating said pair of Risley prisms simultaneously in opposite directions.

20. The device of claim 19 further including another pair of Risley prisms disposed in said collimated light between said afocal lens group and said focal lens group.

21. The device of claim 20 further including means for relatively rotating said another pair of Risley prisms simultaneously in opposite directions.

22. The device of claim 21 in which said pair of Risley prisms and said another pair of Risley prisms are disposed to laterally move said collimated light laterally of said device along lateral directions which are mutually orthogonal to one another.

23. A day/night viewing and laser range finding device comprising;

an objective lens receiving light from a distant scene and providing this light to an optical pathway leading to an eyepiece lens, an image intensifier tube receiving light via said objective lens and responsively providing a visible image replicating said scene, an optical pathway extending from said image intensifier tube to said eyepiece lens; said device comprising:

a laser light source projecting a laser light beam into said scene via said objective lens;

an afocal lens group associated with said objective lens and passing said light from the distant scene to collimate this light;

a focal lens group receiving said collimated light and focusing this light to an image plane; and means for laterally moving one of said collimated light and said focal lens group both to relatively move an image of said scene at said image plane laterally of said device and to relatively move said laser light beam in said scene.

24. The device of claim 23 wherein said means for moving one of said collimated light and said focal lens group laterally of said device includes means for moving said focal lens group laterally of said device along a pair of mutually orthogonal directions mutually exclusive of one another.

25. The device of claim 24 in which said pair of mutually orthogonal directions are respectively oriented horizontally and vertically of said device, thus to provide respective windage and elevation relative movements of an image of said scene provided at said eyepiece lens, and to respectively move said laser light beam in said scene along respective horizontal and vertical directions.

26. The device of claim 23 wherein said means for moving one of said collimated light and said focal lens group laterally of said device includes means for moving said collimated light laterally of said device along one of a pair of mutually orthogonal directions while simultaneously moving said laser light beam in said scene along corresponding directions.

27. The device of claim 26 in which said means for moving said collimated light and laser light beam includes a pair of Risley prisms disposed in said collimated light between said afocal lens group and said focal lens group.

28. The device of claim 27 further including means for relatively rotating said pair of Risley prisms simultaneously in opposite directions.

29. The device of claim 27 further including another pair of Risley prisms disposed in said collimated light between said afocal lens group and said focal lens group.

30. The device of claim 29 further including means for relatively rotating said another pair of Risley prisms simultaneously in opposite directions.

31. The device of claim 30 in which said pair of Risley prisms and said another pair of Risley prisms are disposed to laterally move said collimated light laterally of said device while simultaneously moving said laser light beam in said scene both along lateral directions which are mutually orthogonal to one another.

32. A method of operating an optical device to effect movement of an image of a distant scene relative to an eyepiece of the device; the method comprising steps of:

providing an afocal lens group, and using this lens group to receive and collimate light from a distant scene;

providing a focal lens group receiving and focusing the collimated light to an image plane; and performing a step selected from the group consisting of: moving the focal lens group perpendicularly relatively to an optical axis of the devices or angularly redirecting the collimated light to move an image of the scene at the image plane laterally of the device.

33. The method of claim 32 wherein said step of moving said focal lens group perpendicularly relative to an optical axis of the device includes the step of moving the focal lens group in a selected one of two orthogonal directions each of which is perpendicular to said optical axis, and in which movement of the focal lens group is mutually exclusive of movement of the focal lens group in the other of said two orthogonal directions.

34. The method of claim 32 further including the step of redirecting angularly said collimated light in one of two mutually perpendicular planes parallel with an optical axis of the device.

35. The method of claim 34 including the step of using a pair of Risley prisms disposed in said collimated light between said afocal lens group and said focal lens group to redirect said collimated light.

36. The method of claim 35 further including the step of relatively rotating said pair of Risley prisms simultaneously in opposite directions.

* * * * *